United States Patent

[11] 3,604,438

[72] Inventor Kurt Fries
Markgroninger Strasse 64, Stuttgart-Zuffenhausen, Germany

[21] Appl. No. 849,725
[22] Filed Aug. 13, 1969
[45] Patented Sept. 14, 1971
[32] Priority Aug. 24, 1968
[33] Germany
[31] P 17 97 173.2

[54] MACHINE FOR ETCHING AND RINSING PRINTING PLATES
6 Claims, 3 Drawing Figs.

[52] U.S. Cl. .......... 134/148, 134/149, 134/153, 134/161, 134/164, 134/194
[51] Int. Cl. .......... B08b 3/02
[50] Field of Search .......... 134/94, 140, 142, 147–149, 152–153, 159, 161–162, 164, 177, 194, 200

[56] References Cited

UNITED STATES PATENTS

| | | | |
|---|---|---|---|
| 212,125 | 2/1879 | Bray | 134/159 X |
| 993,503 | 5/1911 | Browning | 134/147 |
| 1,396,466 | 11/1921 | Roever | 134/153 X |
| 1,511,648 | 10/1924 | Wennerblad et al. | 134/159 |
| 2,776,611 | 1/1957 | Accrocco | 134/140 X |
| 2,947,235 | 8/1960 | Faeber | 134/147 X |
| 3,088,391 | 5/1963 | Sigler | 134/153 X |
| 3,093,149 | 6/1963 | Jaffe et al. | 134/153 X |
| 3,122,150 | 2/1964 | Henderson | 134/161 X |
| 3,323,528 | 6/1967 | Link | 134/140 X |

*Primary Examiner*—Robert L. Bleutge
*Attorney*—Arthur O. Klein

ABSTRACT: A machine for etching and washing both cylindrical and flat printing plates of metal or of photopolymerizable material which comprises a treatment tank and two different interchangeable mounting supports which can be fitted selectively in the tank. One mounting support is arranged for supporting cylindrical plates and the other for supporting flat plates. The tank is provided with a drive and the two supports have couplings by which either can be coupled to the drive when it is fitted in the tank so that the support is moved by the drive to agitate the printing plate in liquid in the tank to either etch or wash the plate.

INVENTOR:
Kurt FRIES
BY: Arthur O. Klein
his Attorney

INVENTOR:
Kurt FRIES
BY: Arthur O. Klein
his Attorney

INVENTOR:
Kurt FRIES
BY: Arthur O. Klein
his Attorney

MACHINE FOR ETCHING AND RINSING PRINTING PLATES

This invention relates to machines for etching and rinsing both cylindrical and flat printing plates of metal or of photopolymerisable materials, and which include a mounting support for the printing plates in a processing tank.

In the preparation of metal printing plates it is known to etch both cylindrical and flat printing plates in the same etching machine. For this purpose the machine is provided with two different covers which are used as alternatives to each other, one for the cylindrical printing plates and the other for the flat plates. When changing over from one kind of printing plate to the other the cover installed on the machine has to be removed and the other cover put in its place. This exchanging of covers is a cumbersome operation. It is first of all necessary to remove balancing weights, which subsequently have to be installed again. A particular disadvantage is that the cover, which also has to be removed, must be thoroughly cleaned each time to remove aggressive residue such as iron chloride, nitric acid, alcohol, sodium hydroxide and the substance used to protect the flanks, after which the cover has to be dried. This is necessary for the sake of the safety of the operating personnel, as well as to preserve the machinery. There must be a space available in the workshop for receiving the cover while it is drying. An electric driving motor for the machine is usually permanently fixed to the cover, and each time a change is made from one kind of printing plate to another the various electric leads have to be disconnected and subsequently reconnected, and of course this must be correctly done. All these operations are performed in an etching shop in which the atmosphere contains considerable vapors from the solutions. Under certain circumstances the change over requires between two and three hours to complete.

With regard to rinsing and washing arrangements for the plates, installations are known for printing plates of photopolymerisable materials, which consist of two separate pieces of washing apparatus, one for washing cylindrical printing plates and the other for flat printing plates. The two pieces of washing apparatus are installed next to each other and both are driven by a common drive. These known washing installations have the considerable disadvantage that only one of the two pieces of apparatus can be used at a time, so that at any time only cylindrical plates or only flat plates can be washed. To change over from one piece of apparatus to the other a selector switch must be actuated, and a pressure line changed over. This involves switching motors by means of magnetic valves, and operating 3-way valves by hand. These known washing installations are not economical to operate, due to the cumbersome manipulations involved, and in the light of their high first cost.

Cylindrical/flat combination washing installations are also known in which the flat printing plates are moved by hand by means of a crank. However it has been found that a precise washing of the printing plates cannot be obtained by this means, presumably because it is not possible to move the plates evenly enough in the washing liquid. A further disadvantage of this arrangement is that the installation has a considerable depth, with correspondingly high initial coast.

The object of the present invention is to provide a machine for etching and washing both cylindrical and flat printing plates of metal or of photopolymerisable material, free from the disadvantages mentioned above. The machine is of extremely simple construction and allows the change over to be made from one kind of printing plate to the other very rapidly. To this end, according to the invention, such a machine comprises a treatment tank and two different mounting supports one for supporting cylindrical plates and the other for supporting flat plates in the tank the mounting supports being interchangeable and both being detachably fit table one at a time in the treatment tank and both being arranged to be coupled to a drive, which is able to move both the mounting supports, one at a time, in the tank.

This arrangement allows the same etching machine or washing machine to be used for processing both cylindrical and flat printing plates. To change over from one kind of printing plate to the other it is merely necessary to exchange the mounting support. Since the drive is through a coupling which can be coupled to drive either of the two mounting supports, there is therefore no necessity to make any change to the electrical connections. The change over can be effected very rapidly, within a period of a few minutes.

In order to shorten still further the time taken to change over, according to a further feature of the invention, a drive shaft of each of the mounting supports which is arranged to be coupled to the drive is arranged to be detachably supported in bearings in the ends of a hoodlike cover pivotally attached to the treatment tank.

The same cover is thus used irrespective of whether cylindrical plates or flat plates are being washed. The fact that the cover is pivoted on the tank makes it easy to remove and install the drive shafts of the mounting supports. When the cover is swung open its interior is easily accessible.

In a preferred example of the invention, the drive shaft of the mounting support for flat plates is equipped with a bevel drive in the form of a pair of bevel wheels giving a high speed or low speed gear ratio. The speed ratio can be 1:1, or preferably some higher or lower ratio. A crank arm is mounted on the driven bevel wheel of the bevel drive, the arm extending parallel to the drive shaft and a flanged wheel being mounted on the crank and being guided by rails mounted on a mounting support plate for supporting the flat printing plates to cause the support plate to perform a to and fro movement.

This driving arrangement allows the printing plate, mounted on its mounting support, to be moved evenly in the treatment liquid, giving the best possible washing effect. The weight of the mounting support plate is taken up by a running rail along which the mounting support runs on rollers.

An example, and a modification of the example, of a machine constructed in accordance with the invention is illustrated in the accompanying drawings in which.

Figure 1:
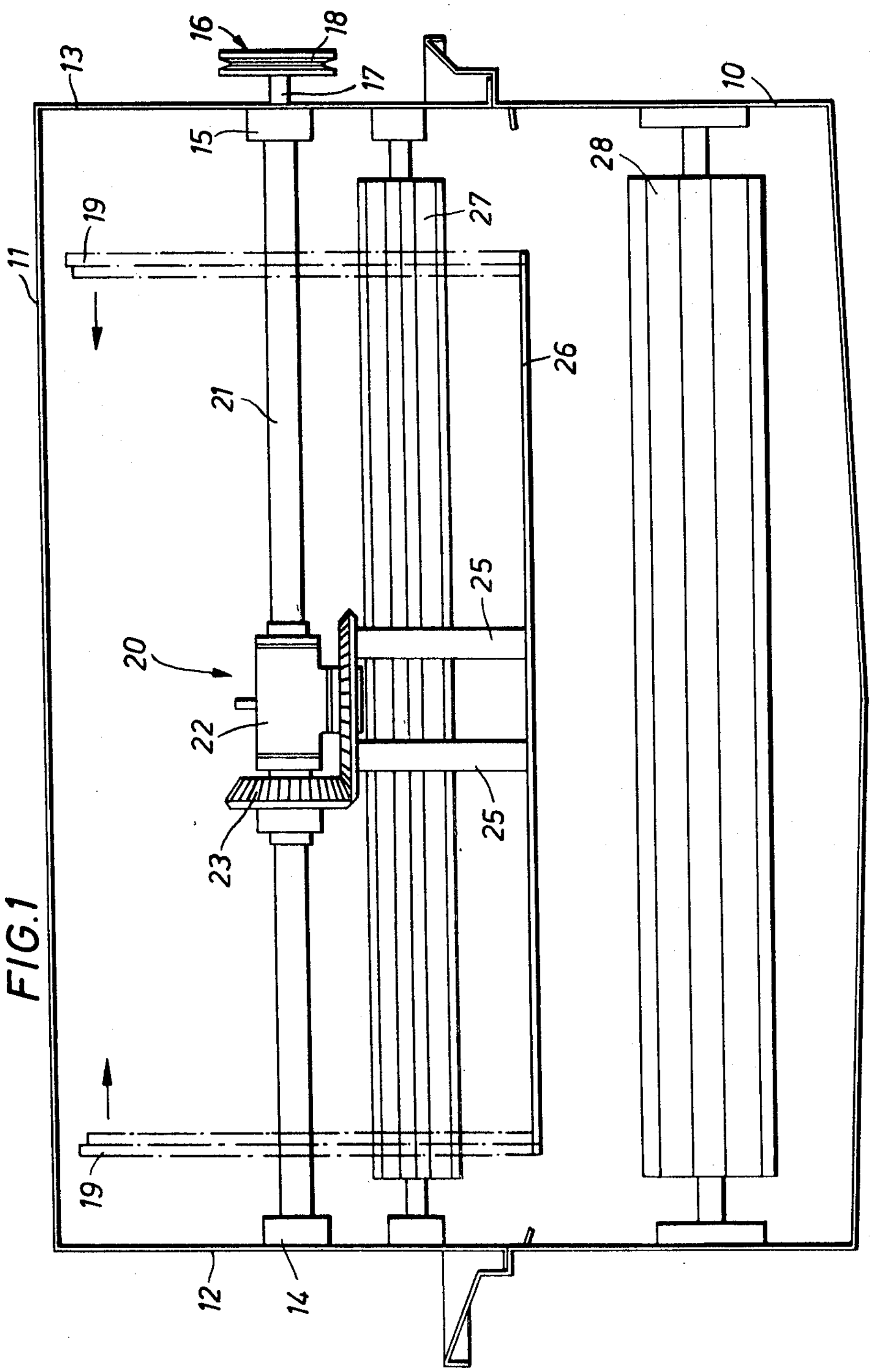
FIG. 1 is a side view of the machine.

The etching machine shown in the drawings comprises a treatment tank 10, the upper part of which is covered by a hood shaped cover 11. The cover has ends 12 and 13 in which there are bearings 14 and 15 into which a driven shaft can easily be inserted. The shaft is arranged to be coupled to a driving device 16. In this example the driving device 16 consists of a stub shaft 17 on which a pulley wheel 18 for a V-belt drive is mounted.

When the machine is to be used for etching cylindrical printing plates, the cover 11 is swung open and a mounting support for the cylindrical plate is installed. The mounting support consists essentially of a driven shaft (not shown) on which are mounted discs 19, which are indicated in broken lines in FIGS. 1 and 2. The cylindrical printing plates themselves are mounted on the discs 19 by means not shown in the drawing. The discs 19 are axially slidable along the shaft, to allow even comparatively short printing plates to be mounted on the discs.

On the other hand, wherein the device is to be used for etching flat printing plates, the cover is swung open, the mounting support for the cylindrical plates is removed and a mounting support 20 for flat plates is installed. The mounting support 20 has a shaft 21 the ends of which are fitted in the bearings 14 and 15, one end of the shaft 21 being coupled to the driving stub shaft 17. The middle part of the shaft 21 is supported in a bearing 22. On the other half of the shaft 21 a bevel gear wheel 23 is mounted which engages with a driven double gear wheel 24, which rotates in a plane parallel to the shaft 21. Attached to the driven bevel gear wheel 24 are bolts 25, on which the mounting support plate 26 for supporting the flat printing plate is mounted. By suitably arranging the bevel drive, as described above, the flat printing plate is given an even movement. The mounting support plate 26 can be installed as part of the bevel drive, or be separately supported depending on the size of the machine.

Figure 2:
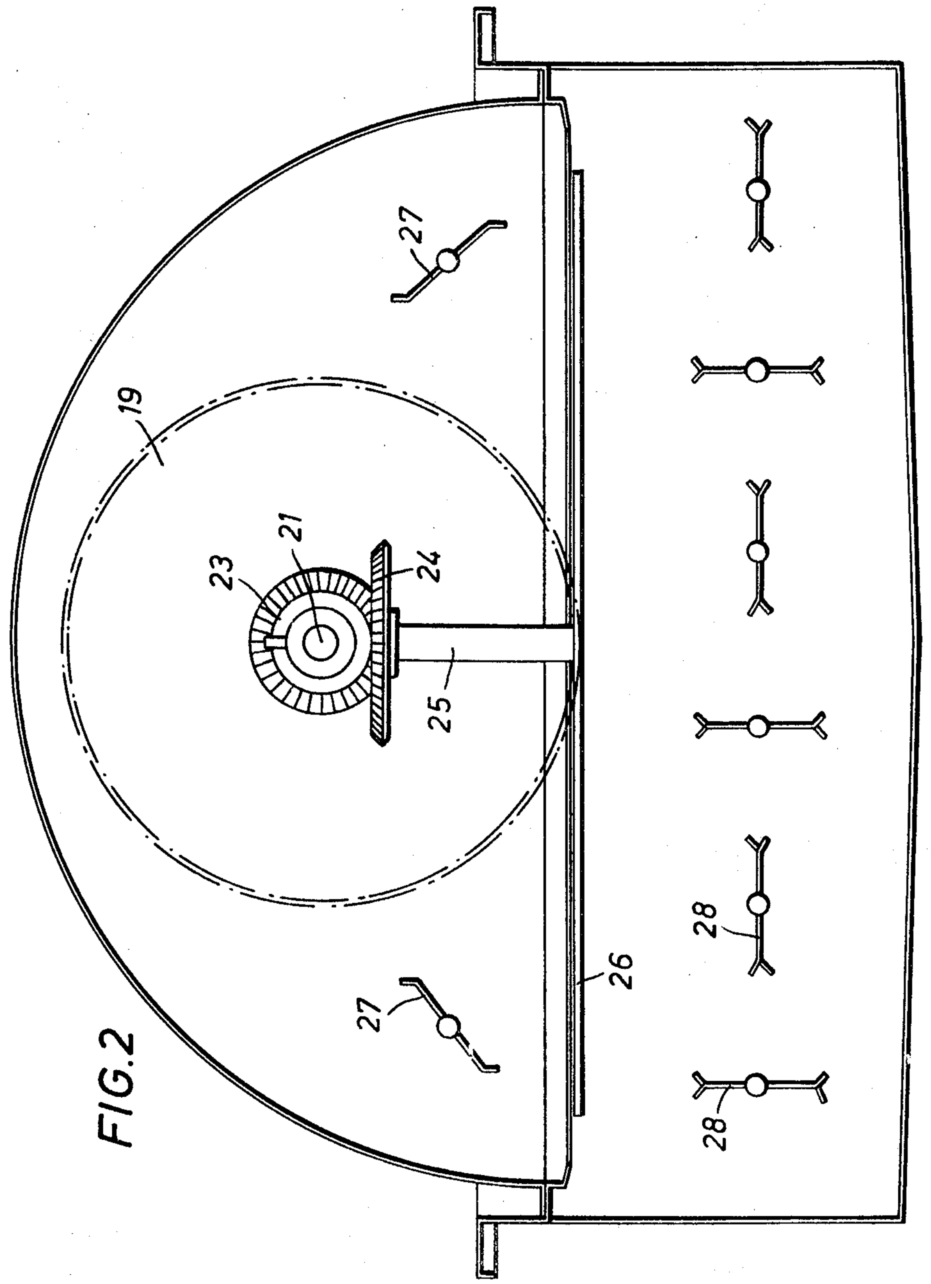
FIG. 2 is an end view.

Rotary air fans which are usually installed in a machine of this kind are indicated at 27 and 28 in FIGS. 1 and 2.

Figure 3:
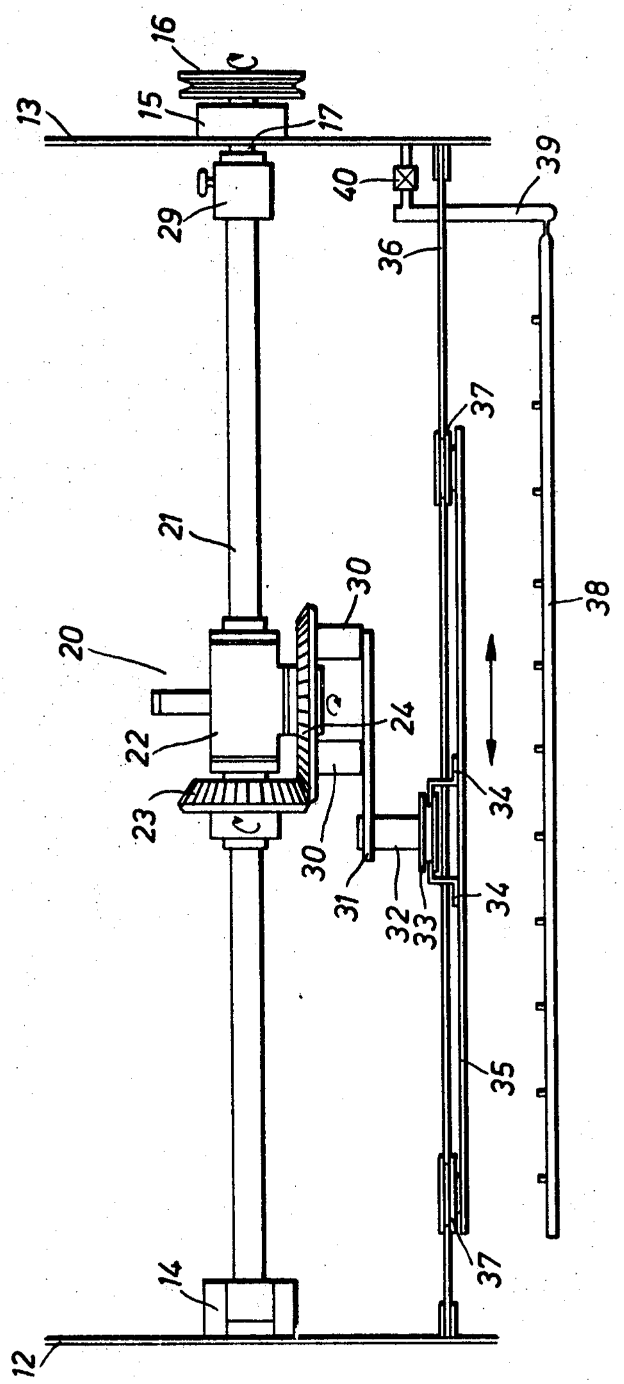
FIG. 3 is a plan view showing a modified mounting support for a flat printing plate in the machine.

The machine may alternatively be arranged as shown in FIG. 3 for washing flat printing plates. On the driving shaft 21 of the mounting support 20 there is a sliding sleeve coupling 29 for coupling the shaft 21 to the stub shaft 17. The shaft 21 is supported at its middle by a bearing, on the other side of which the bevel gear wheel 23 is mounted and this meshes with the driven bevel wheel 24. Mounted on the lower surface of the bevel wheel 24 there are two bolts 30 carrying a crank arm 31. The free end of the crank arm 31 has a crankpin 32 on which is mounted a flanged wheel 33, which coacts with guide rails 34 attached to a mounting support plate 35 for the flat printing plate. The mounting plate 35 has rollers 37 which support the mounting plate 35 and roll along a rail 36.

When the modified washing machine shown in FIG. 3 is to be used for washing cylindrical printing plates, a driving shaft on which are mounted supporting discs (not shown in FIG. 3) is installed in the bearings 14 and 15, similarly to the arrangement described with reference to FIG. 1. The shaft is coupled to the stub shaft 17, so that when the driving motor is started the mounting discs begin to rotate and the cylindrical printing plate mounted on them is washed.

On the other hand when the washing machine shown in FIG. 3 is to be used for washing flat printing plates, the mounting support for the cylindrical printing plates is removed and replaced by the mounting support 20 for the flat printing plates. This exchange is effected by installing the drive shaft 21 in the bearings 14 and 15, and connecting the drive shaft to the driving stub shaft 17 by means of the sliding sleeve 29. Assuming that the bevel drive is suitably dimensioned, rotation of the crank arm 31, with its flanged wheel 33, coacting with the rail 34, gives the mounting support plate 35 a to and fro movement which ensures that the flat printing plate is moved back and forth evenly in the washing tank.

For washing a cylindrical printing plate the washing apparatus has nozzles arranged axially around the rotating mounting support. On the other hand when the machine is being used for washing a flat printing plate a manifold 38 equipped with a row of nozzles, as indicated in FIG. 3 is installed by means of rapid action connectors. The flow of washing liquid is controlled by a 3-way valve 40 connected to an annular duct 39, which feeds liquid to the manifold 38. The valve 40 is situated inside the machine, which is a great advantage in the event of a leak. In the washing operation described above the cover is equipped with a spray tube, or washing tube (not shown) and a nonreturn valve (also not shown), these parts being so arranged that they swing out of the way when the cover is opened. This way of arranging the washing tube in the cover of the machine ensures that the printing plate, whether cylindrical or flat, is satisfactorily washed.

Although the invention is illustrated and described with reference to a plurality of embodiments thereof, it is to be expressly understood that it is in no way limited to the disclosure of such a plurality of embodiments, but is capable of numerous modifications within the scope of the appended claims.

1. In a machine for etching a washing both cylindrical and flat printing plates of metal or of photopolymerisable material, said machine including a treatment tank, mounting support means for supporting said plates in said tank and drive means for moving said mounting means to move said printing plates in said tank, the improvement comprising the provision of two different interchangeable mounting support means, one of said mounting support means being arranged to support cylindrical plates and the other of said support means being arranged to support flat plates, means selectively and detachably mounting said mounting support means in said tank and means for detachably coupling said mounting support means to said drive means when said mounting support means is mounted in said tank.

2. A machine as claimed in claim 1, further comprising a hoodlike cover, means pivotally attaching said cover to said treatment tank, a pain of bearings and means fixing said bearings to end portions of said cover, and wherein each of said mounting support means includes a drive shaft adapted to be carried in said bearings when said mounting support means is mounted in said tank and coupling means for coupling said drive shaft to said drive means when said drive shaft is carried in said bearings.

3. A machine as claimed in claim 2, wherein said mounting support means for said flat plates includes bevel drive means including a driving bevel gear and a driven bevel gear meshing with said driving bevel gear, said meshing bevel gears being adapted to provide a high speed and a low speed gear ratio.

4. A machine as claimed in claim 3, further comprising a crank arm, means mounting said crank arm on said driven bevel gear, said arm extending in a plane parallel to said drive shaft, a flanged wheel and means mounting said flanged wheel on said crank arm, and wherein said mounting support means for said flat plates includes a mounting support plate, and guide rails fixed to said plate, said flanged wheel engaging said guide rails whereby said mounting support plate is caused to perform a to and fro movement in said tank when said crank arm is rotated by said driven bevel gear.

5. A machine as claimed in claim 4, further comprising guide rail means mounted in said tank, guide rollers running on said guide rail means and means rotatably mounting said guide rollers on said mounting support plate.

6. A machine as claimed in claim 1, further comprising a spray manifold, means mounting said manifold in said tank, nozzle means mounted on said manifold, means defining an annular duct within said tank, a 3-way valve connected to said duct, means connecting said annular duct to said manifold and means for connecting said annular duct to a supply of liquid whereby a printing plate carried by one of said mounting support means in said tank is sprayed with liquid.